(12) United States Patent
Allan

(10) Patent No.: US 10,523,456 B2
(45) Date of Patent: Dec. 31, 2019

(54) MULTIPOINT TO MULTIPOINT TREES FOR COMPUTED SPRING MULTICAST

(71) Applicant: Telefonaktiebolaget LM Ericsson (publ), Stockholm (SE)

(72) Inventor: David Ian Allan, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/089,002

(22) PCT Filed: Mar. 28, 2016

(86) PCT No.: PCT/IB2016/051751
§ 371 (c)(1),
(2) Date: Sep. 27, 2018

(87) PCT Pub. No.: WO2017/168203
PCT Pub. Date: Oct. 5, 2017

(65) Prior Publication Data
US 2019/0116053 A1  Apr. 18, 2019

(51) Int. Cl.
*H04L 12/18* (2006.01)
*H04L 12/46* (2006.01)
(Continued)

(52) U.S. Cl.
CPC ............ *H04L 12/185* (2013.01); *H04L 12/18* (2013.01); *H04L 12/4633* (2013.01);
(Continued)

(58) Field of Classification Search
None
See application file for complete search history.

(56) References Cited

U.S. PATENT DOCUMENTS 6,778,531 B1  8/2004 Kodialam et al.
6,798,739 B1  9/2004 Lee
(Continued)

FOREIGN PATENT DOCUMENTS

CN  102142970 B  12/2013
EP  2940938 A1  11/2015
WO  2014139564 A1  9/2014

OTHER PUBLICATIONS

Aggarwal, et al., "BGP MPLS Based Ethernet VPN, draft-ietf-l2vpn-evpn-00," IETF Network Working Group Internet Draft, Feb. 24, 2012, 39 pages.
(Continued)

*Primary Examiner* — Kodzovi Acolatse
(74) *Attorney, Agent, or Firm* — Nicholson, De Vos, Webster & Elliott, LLP

(57) ABSTRACT

A method and apparatus is executed by a network device in a source packet in routing (SPRING) network. The method is to establish a multipoint to multipoint multicast distribution tree where the network device is selected as a rendezvous point for the multipoint to multipoint multicast distribution tree. The method includes advertising the rendezvous point with a multicast group identifier and multicast segment identifier via a control plane protocol, receiving at least one interest registration from receivers of the multicast group via the control plane protocol, and constructing the multipoint to multipoint multicast distribution tree with the rendezvous point as a root and each of the receivers as leaves using unicast tunnels and replication points.

20 Claims, 6 Drawing Sheets

(51) Int. Cl.
*H04L 12/761* (2013.01)
*H04L 12/721* (2013.01)
*H04L 12/753* (2013.01)

(52) U.S. Cl.
CPC .............. *H04L 45/16* (2013.01); *H04L 45/34* (2013.01); *H04L 45/48* (2013.01)

(56) References Cited

U.S. PATENT DOCUMENTS

| | | | |
|---|---|---|---|
| 6,857,012 | B2 | 2/2005 | Sim et al. |
| 7,310,335 | B1* | 12/2007 | Garcia-Luna-Aceves .................... H04L 12/185 370/390 |
| 7,830,787 | B1 | 11/2010 | Wijnands et al. |
| 8,005,081 | B2 | 8/2011 | Bragg et al. |
| 8,121,056 | B1 | 2/2012 | Aggarwal et al. |
| 8,223,668 | B2 | 7/2012 | Allan et al. |
| 8,307,422 | B2 | 11/2012 | Varadhan et al. |
| 8,310,957 | B1 | 11/2012 | Rekhter et al. |
| 8,488,603 | B2 | 7/2013 | Zha et al. |
| 8,611,359 | B1 | 12/2013 | Kompella et al. |
| 8,811,388 | B2 | 8/2014 | Fedyk |
| 8,867,367 | B2 | 10/2014 | Allan |
| 8,953,590 | B1 | 2/2015 | Aggarwal et al. |
| 9,112,848 | B2 | 8/2015 | Allan |
| 9,430,262 | B1 | 8/2016 | Felstaine et al. |
| 9,794,148 | B1* | 10/2017 | Ramachandran ....... H04L 45/22 |
| 10,069,639 | B2 | 9/2018 | Bragg et al. |
| 2003/0085931 | A1 | 5/2003 | Card et al. |
| 2003/0176931 | A1 | 9/2003 | Pednault et al. |
| 2006/0221867 | A1* | 10/2006 | Wijnands ................ H04L 45/02 370/255 |
| 2006/0268871 | A1 | 11/2006 | Van Zijst |
| 2007/0133568 | A1 | 6/2007 | Qing et al. |
| 2007/0140107 | A1* | 6/2007 | Eckert ..................... H04L 12/18 370/216 |
| 2007/0147372 | A1* | 6/2007 | Liu ......................... H04L 12/18 370/390 |
| 2007/0171851 | A1 | 7/2007 | Beckmann et al. |
| 2007/0189193 | A1 | 8/2007 | Previdi et al. |
| 2008/0144644 | A1 | 6/2008 | Allan et al. |
| 2008/0279101 | A1 | 11/2008 | Wu et al. |
| 2008/0298360 | A1* | 12/2008 | Wijnands ................ H04L 12/18 370/389 |
| 2009/0201803 | A1 | 8/2009 | Filsfils et al. |
| 2009/0310538 | A1 | 12/2009 | Lee et al. |
| 2010/0020797 | A1 | 1/2010 | Casey et al. |
| 2010/0281106 | A1 | 11/2010 | Ashwood-Smith |
| 2010/0316056 | A1 | 12/2010 | Unbehagen et al. |
| 2011/0170403 | A1 | 7/2011 | Ashwood-Smith et al. |
| 2011/0202761 | A1 | 8/2011 | Sarela et al. |
| 2011/0228780 | A1 | 9/2011 | Ashwood-Smith et al. |
| 2011/0273980 | A1 | 11/2011 | Ashwood Smith |
| 2011/0299427 | A1 | 12/2011 | Chu et al. |
| 2011/0305239 | A1 | 12/2011 | Chandrashekharachar |
| 2012/0063451 | A1 | 3/2012 | Keesara et al. |
| 2012/0063465 | A1 | 3/2012 | Keesara et al. |
| 2012/0075988 | A1 | 3/2012 | Lu et al. |
| 2012/0106347 | A1 | 5/2012 | Allan et al. |
| 2012/0147885 | A1 | 6/2012 | Johri et al. |
| 2012/0177041 | A1 | 7/2012 | Berman |
| 2012/0177042 | A1 | 7/2012 | Berman |
| 2012/0177043 | A1 | 7/2012 | Berman |
| 2012/0201539 | A1 | 8/2012 | Boertjes et al. |
| 2012/0233350 | A1 | 9/2012 | Unbehagen et al. |
| 2012/0300774 | A1 | 11/2012 | Casey et al. |
| 2013/0010790 | A1 | 1/2013 | Shao |
| 2013/0114466 | A1 | 5/2013 | Koponen et al. |
| 2013/0114595 | A1 | 5/2013 | Mack-Crane et al. |
| 2013/0142511 | A1 | 6/2013 | Spraggs et al. |
| 2013/0195111 | A1 | 8/2013 | Allan et al. |
| 2013/0259046 | A1 | 10/2013 | Ramesh |
| 2014/0036913 | A1 | 2/2014 | Olofsson et al. |
| 2014/0064063 | A1 | 3/2014 | Holness et al. |
| 2014/0086097 | A1 | 3/2014 | Qu et al. |
| 2014/0092898 | A1 | 4/2014 | Berman |
| 2014/0112188 | A1 | 4/2014 | Keesara et al. |
| 2014/0126422 | A1 | 5/2014 | Bragg |
| 2014/0211797 | A1 | 7/2014 | Luo et al. |
| 2014/0241351 | A1* | 8/2014 | Kollipara ................ H04L 45/16 370/390 |
| 2014/0241352 | A1* | 8/2014 | Kollipara ................ H04L 45/16 370/390 |
| 2014/0254592 | A1* | 9/2014 | Olofsson ............. H04L 12/1863 370/390 |
| 2014/0376366 | A1 | 12/2014 | Li et al. |
| 2015/0156106 | A1 | 6/2015 | Allan |
| 2015/0188771 | A1 | 7/2015 | Allan et al. |
| 2015/0319007 | A1 | 11/2015 | Allan |
| 2015/0358226 | A1* | 12/2015 | Liu ......................... H04L 12/18 370/390 |
| 2016/0028625 | A1 | 1/2016 | Hari et al. |
| 2016/0277291 | A1 | 9/2016 | Lakshmikanthan et al. |
| 2016/0308793 | A1 | 10/2016 | Levy-Abegnoli et al. |
| 2017/0012880 | A1 | 1/2017 | Yang |
| 2017/0078188 | A1 | 3/2017 | Allan |
| 2017/0093612 | A1 | 3/2017 | Singh et al. |
| 2017/0093689 | A1 | 3/2017 | Manur et al. |
| 2018/0324090 | A1 | 11/2018 | Duncan et al. |

OTHER PUBLICATIONS

Sajassi, et.al., "PBB E-VPN, draft-ietf-l2vpn-pbb-evpn-02," IETF Trust, Internet Working Group, Internet Draft, Mar. 29, 2012, 27 pages.
Aggarwal, et al. "BGP MPLS Based Ethernet VPN, draft-raggarwa-sajassi-l2vpn-evpn-04.txt", Internet Engineering Task Force (IETF), Network Working Group, Internet-Draft, Sep. 12, 2011, 43 pages.
Allan, et al., "Shortest Path Bridging, MAC Mode Support over EVPN, draft-ietf-bess-spbm-evpn-02," Internet Engineering Task Force (IETF), BESS Working Group, Internet-Draft, Oct. 2015, 11 pages.
Allen, et al., "A Framework for Computed Multicast applied to MPLS based Segment: draft-allan-spring-mplsmulticast-framework-OO.txt," SPRING Working Group, Feb. 23, 2016, pp. 1-13.
Bhaskar, et al., "Bootstrap Router (BSR) Mechanism for Protocol Independent Multicast (PIM); rfc5059.txt," 5. JCT-VC Meeting; 96. MPEG Meeting; Mar. 16, 2011-Mar. 23, 2011; Geneva; (Joint Collaboartive Team on Video Coding of ISO/IEC JTC1/SC29/WG11 and ITU-T SG.16); URL: http://wftp3.itu.int/av-arch/jctvc-site, Internet Engineering Task Force, IETF, CH, Jan. 1, 2008 (Jan. 1, 2008), XP015055131, ISSN: 0000-0003, Complete chapter "1. Introduction"; p. 3-p. 8.
Boudani, et al., "An Effective Solution for Multicast Scalability: The MPLS Multicast Tree (MMT)—draft-boudani-mpls-multicast-tree-06.txt," Internet Draft, Oct. 2004, 21 pages.
Cheng, et al., "IGP Multicast Architecture," draft-yong-pim-igp-multicast-arch-01, IETF, Mar. 9, 2015, pp. 1-15.
Dalal et al., "Reverse Path Forwarding of Broadcast Packets," Communications of the ACM, Dec. 1978, vol. 21 (12), pp. 1040-1048.
Farkas, et al., "IS-IS Path Computation and Reservation, draft-ieft-isis-pcr-02," Internet Engineering Task Force (IETF), IS-IS for IP Internets, Internet-Draft, Sep. 18, 2015, 32 pages.
Filsfils, et al., "Segment Routing Architecture," draft-ietf-spring-segment-routing-07.txt, IETF, ISOC, Dec. 15, 2015, pp. 1-24.
Filsfils, et al., "Segment Routing with MPLS data plane, draft-ietf-spring-segment-routing-mpls-01," Network Working Group, Internet-Draft, May 29, 2015, 14 pages.
Filsfils, et al., "Segment Routing with MPLS data plane, draft-ietf-spring-segment-routing-mpls-02," Network Working Group, Internet-Draft, Oct. 17, 2015, 14 pages.
Filsfils, et al., "Interconnecting Millions of Endpoints With Segment Routing, draft-filsfils-spring-large-scale-interconnect-00," Internet Engineering Task Force (IETF), IETF Trust, Network Working Group, Internet-Draft, Jul. 19, 2015, 10 pages.
Hao, et al., "IGP Multicast Architecture," draft-yong-rtgwg-igp-multicast-arch-01.txt, IETF, ISOC, Nov. 2014, pp. 1-14.

(56) References Cited

OTHER PUBLICATIONS

IEEE 802.1aq: Media Access Control (MAC) Bridges and Virtual Bridged Local Area Networks Amendment 20: Shortest Path Bridging, IEEE Standard for Local and metropolitan area networks, IEEE Computer Society, Jun. 29, 2012, 340 pages.
IEEE 802.1Qca/D2.1: "Draft Standard for Local and Metropolitan Area Networks—Bridges and Bridged Networks—Amendment: Path Control and Reservation," IEEE Computer Society, Jun. 23, 2015, 114 pages.
IEEE P802.1 aq/D4.6: "Draft Standard for Local and Metropolitan Area Networks—, Media Access Control (MAC) Bridges and Virtual Bridged Local Area Networks—Amendment XX: Shortest Path Bridging," Feb. 10, 2012, 363 pages.
Kini, et al. "Entropy labels for source routed stacked tunnels, draft-ietf-mpls-spring-entropy-label-00," Internet Engineering Task Force (IETF), Network Working Group, Internet-Draft, Mar. 5, 2015, 12 pages.
Li, et al. "Merging Source and Shared Trees Multicast in MPLS Networks," PDCAT, Seventh International Conference, Dec. 1, 2006, pp. 23-28.
Previdi, et al., "SPRING Problem Statement and Requirements," draft-ietf-spring-problem-statement-07.txt, IETF, ISOC, Mar. 1, 2016, pp. 1-18.
Rabadan, et al., "Usage and applicability of BGP MPLS based Ethernet VPN—draft-ietf-bess-evpn-usage-01.txt," Internet Engineering Task Force (IETF), Internet Society, Jul. 4, 2015, 30 pages.
RFC 3031: Rosen, et al., "Multiprotocol Label Switching Architecture," Jan. 2001, 61 pages, Request for Comments: 3031.
RFC 3209: Awduche, et al., "RSVP-TE: Extensions to RSVP for LSP Tunnels," Network Working Group, The Internet Society, Request for Comments: 3209, Dec. 2001, 61 pages.
RFC 3353: OOMS, et al., "Overview of IP Multicast in a Multi-Protocol Label Switching (MPLS) Environment," Request for Comments: 3353, Aug. 2002, 30 pages.
RFC 3813: Srinivasan, et al., "Multiprotocol Label Switching (MPLS) Label Switching Router (LSR) Management Information Base (MIB)," Request for Comments: 3813, Jun. 2004, 60 pages.
RFC 4364: Rosen, et al., "BGP/MPLS IP Virtual Private Networks (VPNs)," Feb. 2006, 47 pages, The Internet Society, Network Working Group, Request for Comments: 4364.
RFC 5015: Handley, et al., "Bidirectional Protocol Independent Multicast (BIDIR-PIM)," Network Working Group, Request for Comments: 5015, Oct. 2007, 43 pages.
RFC 5036: Andersson, "LDP Specification," The EITF Trust, Network Working Group, Request for Comments: 5036, Oct. 2007, 135 pages.
RFC 6329: Fedyk, et al., "IS-IS Extensions Supporting IEEE 802.1aq Shortest Path Bridging," Internet Engineering Task Force (IETF), Request for Comments: 6329, Apr. 2012, 38 pages.
RFC 6388: Wijnands, et al. "Label Distribution Protocol Extensions for Point-to-Multipoint and Multipoint-to-Multipoint Label Switched Paths," Internet Engineering Task Force (IETF), Request for Comments: 6388, Nov. 2011, 39 pages.
RFC 6514: Aggarwal, et al., "BGP Encodings and Procedures for Multicast in MPLS/BGP IP VPNs," Internet Engineenng Task Force; IETF, Feb. 2012, pp. 1-59.
RFC 6826: Wijnands, et al., "Multipoint LDP In-Band Signaling for Point-to-Multipoint and Multipoint-to-Multipoint Label Switched Paths," Internet Engineering Task Force (IETF), Request for Comments: 6826, Jan. 2013, 12 pages.
RFC 7734: Allan, et al., "Support for Shortest Path Bridging MAC Mode over Ethernet VPN (EVPN)," Internet Engineering Task Force (IETF), Request for Comments: 7734, IETF Trust, Jan. 2016, 11 pages.
Sajassi, et al., "PBB E-VPN, draft-sajassi-12vpn-pbb-evpn-03.txt," Internet Engineering Task Force (IETF), Network Working Group, Internet-Draft, Oct. 28, 2011, 25 pages.
Allen, et al., "802.1aq and 802.1Qbp Support over EVPN; draft-allan-12vpn-spbm-evpn-00.txt," IETF, Standard Working Draft, ISOC, Jul. 9, 2012, pp. 1-11.
Non-Final Office Action from U.S. Appl. No. 14/850,787, dated Mar. 20, 2019, 35 pages.

* cited by examiner

MULTIPOINT TO MULTIPOINT TREES FOR COMPUTED SPRING MULTICAST

CROSS-REFERENCE TO RELATED APPLICATIONS

This application is a national stage of International Application No. PCT/IB2016/051751, filed Mar. 28, 2018, which is hereby incorporated by reference.

FIELD

Embodiments of the invention relate to the field of implementing multicast communication networks; and more specifically, to the support for multipoint to multipoint multicast distribution trees for source packet in routing (SPRING) networks.

BACKGROUND

Numerous techniques and protocols exist for configuring networks to handle multicast traffic. For Internet Protocol (IP) and/or multiprotocol label switching (MPLS) implementations the existing solutions for multicast are based on multicast label distribution protocol (mLDP) or protocol independent multicast (PIM). These are all techniques that depend on a unicast shortest path first (SPF) computation followed by handshaking between peers to sort out a loop free multicast distribution tree (MDT) for each multicast source. In these approaches, a comprehensive view of multicast connectivity does not exist at the node level, all decisions are entirely local and driven by the combination of the unicast forwarding solution derived from routing information and interactions with immediate peers.

Shortest path bridging (SPB) is a protocol related to computer networking for the configuration of computer networks that enables multipath routing. In one embodiment, the protocol is specified by the Institute of Electrical and Electronics Engineers (IEEE) 802.1aq standard. This protocol replaces prior standards such as spanning tree protocols. SPB enables all paths in the computing network to be active with multiple equal costs paths being utilized through load sharing and similar technologies. The standard enables the implementation of logical Ethernet networks in Ethernet infrastructures using a link state protocol to advertise the topology and logical network memberships of the nodes in the network. SPB implements large scale multicast as part of implementing virtualized broadcast domains. A key distinguishing feature of the SPB standard is that the MDTs are computed from the information in the routing system's link state database via an all-pairs-shortest-path algorithm, which minimizes the amount of control messaging to converge multicast; the only real time peer interaction being advertisement of topology changes to the IGP database.

SPRING is an exemplary profile of the use of MPLS technology whereby global identifiers are used in the form of a global label assigned per label switched route (LSR) used for forwarding to that LSR. A full mesh of unicast tunnels is constructed via every node in the network computing the shortest path to every other node and installing the associated global labels accordingly. In the case of SPRING, this also allows explicit paths to be set up via the application of label stacks at the network ingress. Encompassed with this approach is the concept of a strict (every hop specified) or loose (some waypoints specified) route dependent on how exhaustively the ingress applied label stack specifies the path.

Proposals have been made to use global identifiers in the dataplane combined with the IEEE 802.1aq technique of advertising multicast registrations in the interior gateway protocol (IGP) and replicating the "all pairs shortest path" approach of IEEE 802.1aq to compute MDTs without the additional handshaking associated with legacy approaches to multicast. Such an approach would inherit a lot of desirable properties embodied in the IEEE 802.1aq approach, primarily in the simplification of the amount of control plane exchange required to converge the network. Further proposals have been made to combine the IEEE 802.1aq approach with SPRING tunneling such that multicast distribution tree construction is a hybrid of sparsely deployed multicast state and unicast tunnels significantly reducing the overall amount of multicast state in the network.

Given the above context, a node in the SPRING network could compute its role in implementing any given multicast (S, G) tree purely from information in the IGP. An algorithm that starts with all pairs shortest path computation augmented with algorithms to identify the nodes with specific roles of source, leaf and/or replication point may be employed by each node. Existing unicast tunnels may be used between sources, replication points and leaves of an MDT such that the overall amount of state in the network is minimized. However, SPRING networks do not have support for implementing multipoint to multipoint multicast distribution trees, which offer the benefit of increased scalability due to state and computation minimization by utilizing a single tree to serve all sources in a multicast group. Thus, where such functionality is desired, alternative multicast implementations would need to be utilized such as PIM bi-directional (BI_DIR) or mLDP. These technologies utilize a rendezvous point that senders send traffic to be distributed and where the MDT is rooted at the rendezvous point. However, these technologies would not offer the benefits of computed trees in the form of a further state reduction, increased resiliency, and increased bandwidth efficiency. Therefore, there is considerable benefit to offering a computed/hybrid tree construction bi-directional tree construction option for SPRING.

SUMMARY

In one embodiment, a method is executed by a network device in a source packet in routing (SPRING) network. The method is to establish a multipoint to multipoint multicast distribution tree where the network device is selected as a rendezvous point for the multipoint to multipoint multicast distribution tree. The method includes advertising the rendezvous point with a multicast group identifier and multicast segment identifier via a control plane protocol, receiving at least one interest registration from receivers of the multicast group via the control plane protocol, and constructing the multipoint to multipoint multicast distribution tree with the rendezvous point as a root and each of the receivers as leaves using unicast tunnels and replication points.

In another embodiment, a method is executed by a network device in a source packet in routing (SPRING) network. This method also establishes a multipoint to multipoint multicast distribution tree for a multicast group. The network device is functioning as a node in the multipoint to multipoint multicast distribution tree. The method includes receiving an advertisement of the rendezvous point via a control plane protocol, sending receive interest via control plane protocol for the multicast group, receiving receive interests via the control plane protocol for the multicast group, and determining a role in the multipoint to multipoint multicast distribution tree with the rendezvous as a root and each receive interest as a leaf.

In a further embodiment, a network device in a source packet in routing (SPRING) network is configured to implement a method to establish a multipoint to multipoint multicast distribution tree. The network device is selected as a rendezvous point for the multipoint to multipoint multicast distribution tree. The network device includes a non-statutory machine-readable storage medium having stored therein a multipoint multicast manager and a processor. The processor is coupled to the non-statutory machine-readable storage medium. The processor is configured to execute the multipoint multicast manager. The multipoint multicast manager advertises the rendezvous point with a multicast group identifier and multicast segment identifier via a control plane protocol, receives at least one interest registration from receivers of the multicast group via the control plane protocol, and constructs the multipoint to multipoint multicast distribution tree with the rendezvous point as a root and each of the receivers as leaves using unicast tunnels and replication points.

In one embodiment, a computing device is configured to execute a plurality of virtual machines. The plurality of virtual machines implement network function virtualization (NFV). The computing device is in communication with a network device. The network device is in a source packet in routing (SPRING) network. The network device is configured to implement a method to establish a multipoint to multipoint multicast distribution tree where the network device is selected as a rendezvous point for the multipoint to multipoint multicast distribution tree. The computing device a non-statutory machine-readable storage medium having stored therein a multipoint multicast manager, and a processor. The processor is coupled to the non-statutory machine-readable storage medium. The processor executes a virtual machine from the plurality of virtual machines. The virtual machine to execute the multipoint multicast manager. The multipoint multicast manager advertises the rendezvous point with a multicast group identifier and multicast segment identifier via a control plane protocol, receives at least one interest registration from receivers of the multicast group via the control plane protocol, and constructs the multipoint to multipoint multicast distribution tree with the rendezvous point as a root and each of the receivers as leaves using unicast tunnels and replication points.

In a one embodiment, a control plane device is configured to implement a control plane of a software defined networking (SDN) network including a network device. The network device in a source packet in routing (SPRING) network. The network device is configured to implement a method to establish a multipoint to multipoint multicast distribution tree where the network device is selected as a rendezvous point for the multipoint to multipoint multicast distribution tree. The computing device is a non-statutory machine-readable storage medium having stored therein a multipoint multicast manager, and a processor. The processor is coupled to the non-statutory machine-readable storage medium. The processor is configured to execute the multipoint multicast manager. The multipoint multicast manager advertises the rendezvous point with a multicast group identifier and multicast segment identifier via a control plane protocol, receives at least one interest registration from receivers of the multicast group via the control plane pro-tocol, and constructs the multipoint to multipoint multicast distribution tree with the rendezvous point as a root and each of the receivers as leaves using unicast tunnels and replication points.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
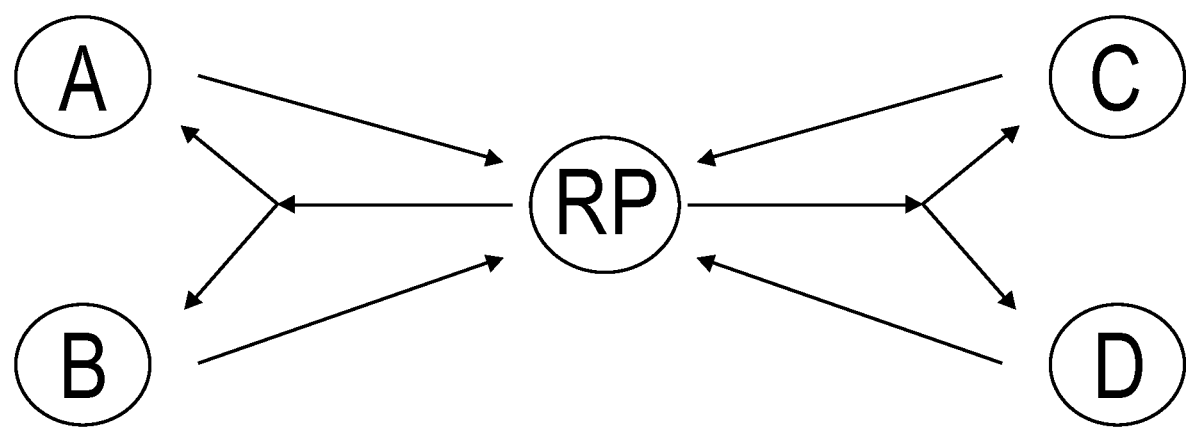
FIG. 1 is a diagram of one embodiment of a network configured for multipoint to multipoint multicast using a rendezvous point.

The following description describes methods and apparatus for establishing multipoint to multipoint multicast distribution trees in a source in packet routing (SPRING) network where the multicast distribution trees are constructed using unicast tunnels and replication points and a single MDT serves all senders and receivers in a multicast group. The method and apparatus utilize a selected rendezvous point in the SPRING network as a root for a point to multipoint multicast distribution tree configured in such a way that sources may use unicast tunneling to send traffic to all receivers in the group via the rendezvous point. Each node in the network can advertise receive interest for a multicast group and each node can send traffic to the group by tunneling group traffic to the root utilizing the set of unicast tunnels that a priori exists as a normal artifact of SPRING operation. Based on the characteristics of a SPRING network, each node can then independently and deterministically determine their role in construction of the multipoint to multipoint multicast distribution tree for each multicast group. The rendezvous point can be selected using any process. In some embodiments, the rendezvous point advertises the multicast group and multicast segment identifier (SID) for which it serves as the rendezvous point. With this information along with the distributed receive interests along with the known topology of the SPRING network each node in the network has sufficient information to determine the multipoint to multipoint multicast distribution trees for each multicast group and to configure the local forwarding information base accordingly. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

Multipoint to multipoint multicast distribution trees (MDTs) are a variation of multicast distribution trees that utilize a central replication point (known as a rendezvous node), and all nodes sending data traffic to a particular multicast group send data traffic to the rendezvous node which then replicates it to the set of receivers using a single MDT for which it is also the root. The data traffic sent to the rendezvous point can be sent via a unicast tunnel from each sending node or via similar mechanism. Structures exists in both protocol independent multicast (PIM) (e.g., PIM bi-directional (BI-DIR) and multicast label distribution protocol (mLDP) to support multipoint to multipoint MDTS, however, there overhead associated with these protocols makes them less efficient and requires additional network resources. Thus, the embodiments provide a process and apparatus for multipoint to multipoint MDTs for use with the less resource intensive computed SPRING network architecture.

Multipoint to Multipoint (MP2MP) Label Switched Paths (LSPs)

An LSP is a path in a multiprotocol label switching (MPLS) protocol or similar protocol used in combination with SPRING networks to forward data packets using labels across the network. An MP2MP LSP is an LSP that has a single MDT rooted on a "rendezvous point" located in the SPRING network as well as the set of sources and unicast tunnels that connect the sources to the rendezvous point. Nodes that are senders to the multicast group tunnel multicast data traffic to the rendezvous point (RP) tagged with some identifier to permit the RP to associate the traffic with the MDT and multicast group, in the SPRING case a multicast SID. The RP reflects traffic onto the MDT where it is replicated and forwarded by the nodes in the MDT to the set of receivers. In some embodiments, a sender will receive a copy of any traffic it sends to the multicast group.

The embodiments provide a method and apparatus that overcome the limitations of the prior art. In the embodiments, a node in the SPRING network is selected and configured to be the rendezvous point for a given multicast group. Any centralized or distributed process can be utilized to determine the rendezvous point using any criteria and input information for selected an optimal or sub-optimal rendezvous point. Once selected, the rendezvous point advertises itself as the rendezvous point for the multicast group using an interior gateway protocol (IGP) or similar protocol that identifies a multicast group identifier and/or a segment identifier (SID) for the multicast group. The rendezvous point configures itself to map incoming packets tagged with the SID to the MDT associated with this SID, where the rendezvous point services as the root of such an MDT.

In the embodiments, nodes in the SPRING network that are sources or senders of data traffic for a given multicast group, send traffic labeled with the SID to the rendezvous packet encapsulated in the rendezvous point unicast SID (e.g., utilizing the a priori existing MP2P tunnel to the RP). Similarly, in the embodiments, nodes in the SPRING network that are receivers or leaves of the multicast group register a receive interest in the multicast group by flooding such receive interest using IGP or similar protocol such that the other nodes of the SPRING network will have sufficient knowledge to construct an MDT using the rendezvous point as a root and with each of the nodes that advertise receive interests as leaves of the MDT. The computation and construction of the multipoint to multipoint MDT or the 'multicast convergence' of the IGP will treat the rendezvous advertisement like it would any other multicast source resulting in an MDT that is a hybrid of unicast tunnels and replication points. The only modification to tree construction procedures being that any rendezvous point configures itself to promiscuously receive the multicast SID on all interfaces, and reflect it appropriately onto all downstream interfaces of the MDT (either as the top label or tunnel encapsulated) such that multiple sources for the group can be served by the common MDT.

The embodiments can provide an MP2MP MDT that has multiple levels of resiliency. In some embodiments, resiliency can be supported by identifying multiple nodes as rendezvous points, such that each of the selected rendezvous points advertises itself as an RP, with a preference value such that the higher preference RPs may be selected over lower preference RPs as a destination for the send data traffic. In some embodiments, the computed SPRING network can instantiate state for all RP rooted trees. If all the RP routed trees were effectively equal, a sender would pick the node with the highest preference value of the set that was currently in the local copy of the IGP database or similarly select a RP. In another embodiment, a node may select an RP that is the highest node after its own identifier was algorithmically combined with the preference value, e.g., if the goal is both resiliency and some load spreading. To support such embodiments with enhanced resiliency, the amount of state would be somewhere between that of a single MDT, and a full (S,G) mesh. A source would also have sufficient information to know if a node failure impacted one RPs MDT and not another, and could override the default load spreading to maintain service by sending to an RP with an unaffected MDT in the case of a failure.

FIG. 1 is a diagram of one embodiment of a network configured for multipoint to multipoint multicast using a rendezvous point. The diagram illustrates an example and simplified SPRING network where a set of nodes A-B are senders and/or receivers of a multicast group where the RP node is a rendezvous point. Any of the nodes A-B can be senders by tunneling data traffic tagged with the multicast SID to be sent to the multicast group to the RP. Similarly, any of the nodes A-B are able to receive data traffic from the multipoint to multipoint multicast distribution tree rooted at the RP by registering an interest and thereby being included for distribution via the mp2mp MDT. The RP can be selected using any centralized or distributed algorithm or by manual configuration or negotiation between the nodes of the SPRING network. The illustrated network is simplified by way of providing clarity. One skilled in the art would understand that any number of nodes can be present in the network and can participate in any number and combination of MDTs including mp2mp MDTs. Intermediate nodes such as replication points of the mp2mp MDTs are not directly illustrated.

Figure 2:
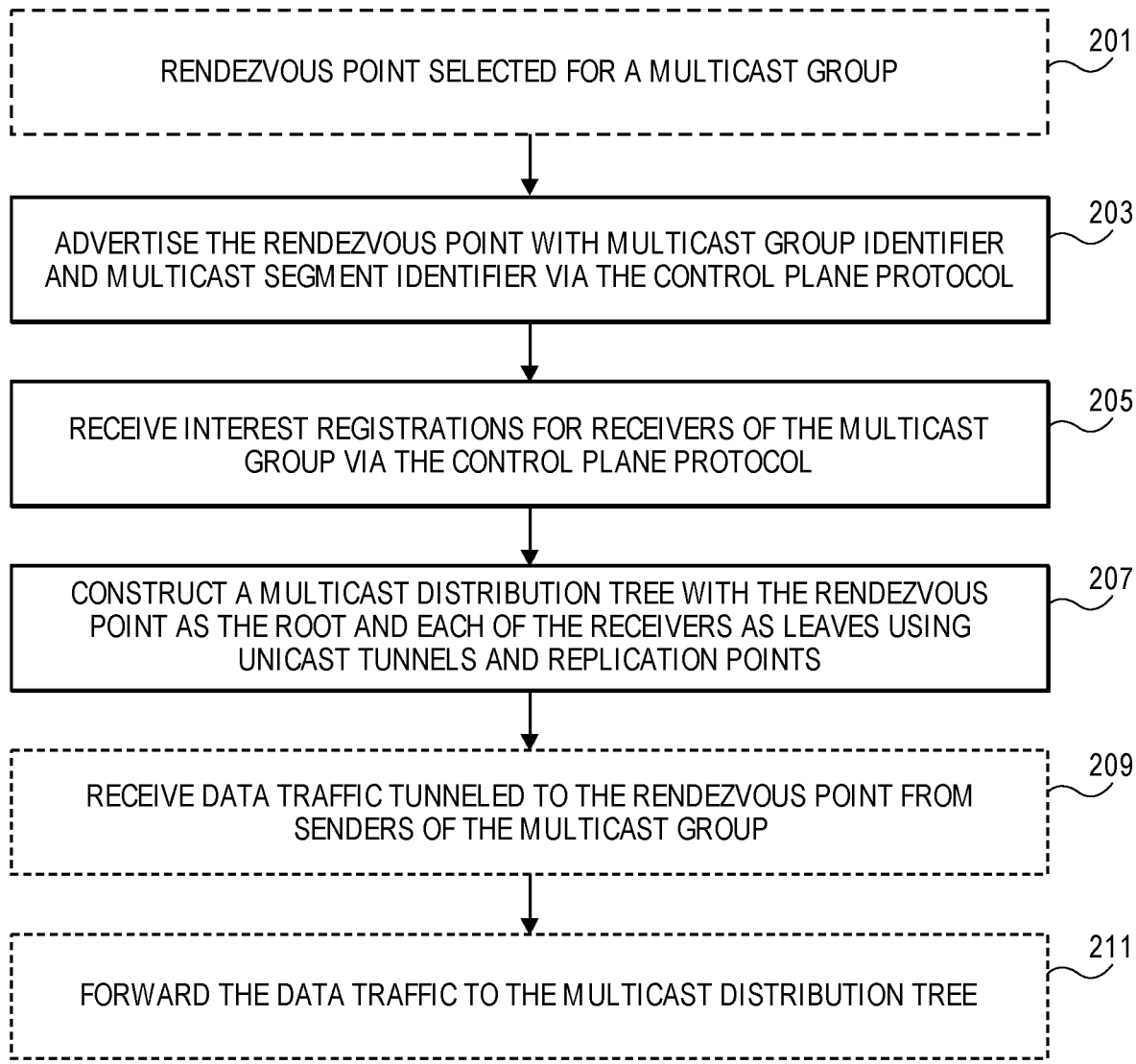
FIG. 2 is a flowchart of one embodiment of a process for a rendezvous point to establish the multipoint to multipoint multicast distribution tree.

FIG. 2 is a flowchart of one embodiment of a process for a rendezvous point to establish the multipoint to multipoint multicast distribution tree. The rendezvous point (RP) can be notified or configured as the RP using any algorithm or process (Block 201). Any centralized, distributed or similar process can be utilized to select the rendezvous point from the nodes in the computed SPRING network. The sequence illustrated is provided by way of example, however, one skilled in the art would understand that the illustrated sequence is not a strict sequence and the steps can be performed in differing order.

Upon selection, the rendezvous point may advertise that it is the RP for a particular multicast group (Block 203). The advertisement can be made using any protocol control plane protocol, for example an interior gateway protocol (IGP). The advertisement may identify the multicast group using any multicast group identifier including an associated multicast segment identifier (SID). The multicast group identifier can be utilized by other nodes in the computed SPRING network to identify the RP and leaves when computing the mp2mp MDT for that multicast group and utilize the SID when installing state to implement the mp2mp MDT.

At any point, other nodes in the network can register receive interests in a multicast group using a control plane protocol (e.g., IGP) or similar protocol to issue joins or similar advertisements of the receive interest (Block 205). These advertisements are distributed to the nodes of the computed SPRING network. Thus, each node in the computed SPRING network has sufficient information to determine the mp2mp MDT for each multicast group. Along with any received send interests that have been advertised and the known location of the RP, the node then computes the mp2mp MDT using the RP as the root and including each node having advertised a receive interest as leaves of the MDT, where the mp2mp MDT is constructed using unicast tunnels to connect the senders to the RP, the RP to replication points and the replication points in turn to additional replication points and leaves (Block 207). This may be referred to as multicast convergence. The process of computing the mp2mp MDT may be reinitiated with any changes to the topology of the network or the constituency of the multicast group membership.

The RP may then after multicast convergence receive data traffic from senders (i.e., sources) for the multicast group (Block 209). The received data traffic may be identified using a multicast SID or similar multicast group identifier. The RP can then associate the received data traffic that has been tunneled to the RP with the corresponding mp2mp MDT. Such data traffic, once associated with the proper mp2mp MDT can then be forwarded and distributed using the p2mp MDT to send the data traffic to each of the subscriber or leaf nodes that have registered a receive interest for the multicast group (Block 211).

Figure 3:
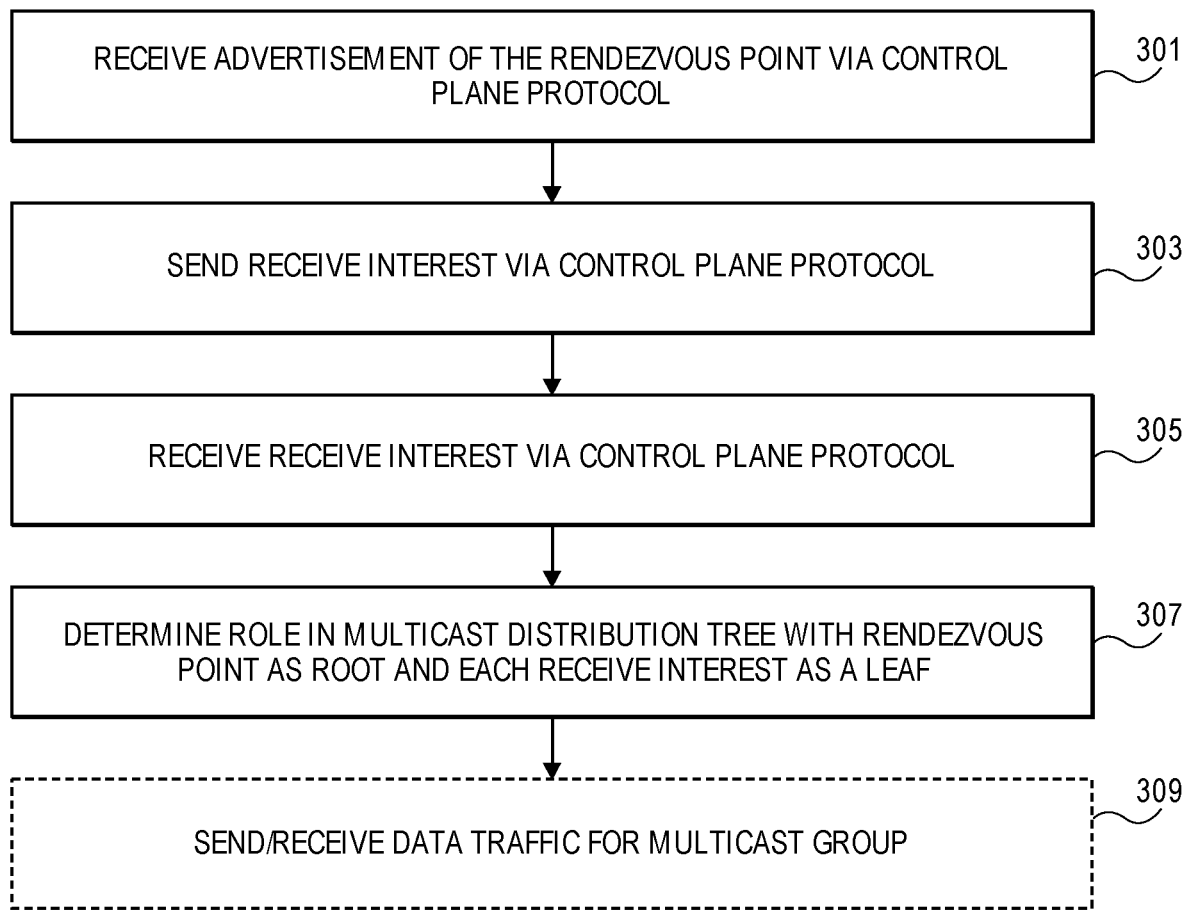
FIG. 3 is a flowchart of one embodiment of a process for a node having a role in a multipoint to multipoint multicast distribution tree.

FIG. 3 is a flowchart of one embodiment of a process for a node having a role in a multipoint to multipoint multicast distribution tree. The node can be notified of the selected or configured RP via an advertisement from the RP using an IGP or similar protocol (Block 301). The sequence illustrated is provided by way of example, however, one skilled in the art would understand that the illustrated sequence is not a strict sequence and the steps can be performed in differing order. The received advertisement of the RP can include a multicast group identifier and multicast SID that can be utilized by the node to identify the RP and associate it with the multicast group when constructing the mp2mp MDT for that multicast group. The RP is the only node that advertises send interest for the multicast group in question.

The node can determine each of the multicast groups that it is a member of or for which it is configured to join and issue the corresponding receive interest advertisements (Block 303). In some embodiments, if the node is a source it can advertise a send interest. However, in other embodiments the nodes do not register send interests and the RP is configured to accept traffic from any node. The receive interests can be distributed using a control plane protocol (e.g., IGP) or similar protocol. At any point, other nodes in the network can also register receive interests in a multicast group using the control plane protocol (e.g., IGP) or similar protocol to issue joins or similar advertisements of the receive interest (Block 305). These advertisements are distributed to the nodes of the computed SPRING network. Thus, each node in the computed SPRING network has sufficient information to determine their role the mp2mp MDT for each multicast group (Block 307). The nodes may receive any number of receive interests. Withdrawal of these receive interests can also be notices that nodes are dropping a multicast group or leaving. Using any receive interests that have been advertised and the known location of the RP, the node then computes the p2mp MDT using the RP as the root and including each node having advertised a receive interest as leaves of the MDT, where the mp2mp MDT is constructed using unicast tunnels to connect senders to the RP, unicast tunnels to connect the RP to replication points and the replication points in turn to additional replication points and leaves. The root itself configures the FIB to promiscuously receive and reflect the multicast SID form any interface. The completion of state installation by all nodes participating in an MDT may be referred to as multicast convergence. The process of computing the mp2mp MDT may be reinitiated with any changes to the topology of the network or the constituency of the multicast group membership.

The node may then after multicast convergence receive data traffic from the mp2mp MDT from senders (i.e., sources) for the multicast group (Block 309). The received data traffic may be identified using a multicast SID or similar multicast group identifier. Similarly, if the node is a sender, then it can send data traffic destined for a multicast group using the SID or similar multicast identifier via a unicast tunnel to the RP, which then reflects this data traffic back to the mp2mp MDT for that multicast group.

The embodiments provide advantages over the prior art by providing a lower overhead mp2mp multicast alternative to PIM-BIDIR or mLDP MP2MP LSPs. In contrast to these technologies, the embodiments provide that the RP is advertised in the IGP rather than using a separate protocol. Further, an RP is distinguished from any other source specific tree in that the RP will program its FIB to receive the SID for the MDT on all interfaces. In some embodiments, the RP does not rely on knowledge of the set of sources it is rooting a tree for. The RP advertisement (e.g., may look like a source specific advertisement with a bit set stating the node is willing to be an RP for that group or similar information) also tells the set of senders the multicast SID to use when sending to the RP as well as to the other nodes in the network to use for MDT construction. The embodiments also encompass resilience mechanisms and IGP advertisement of RPs enables.

Architecture

Figure 4A:
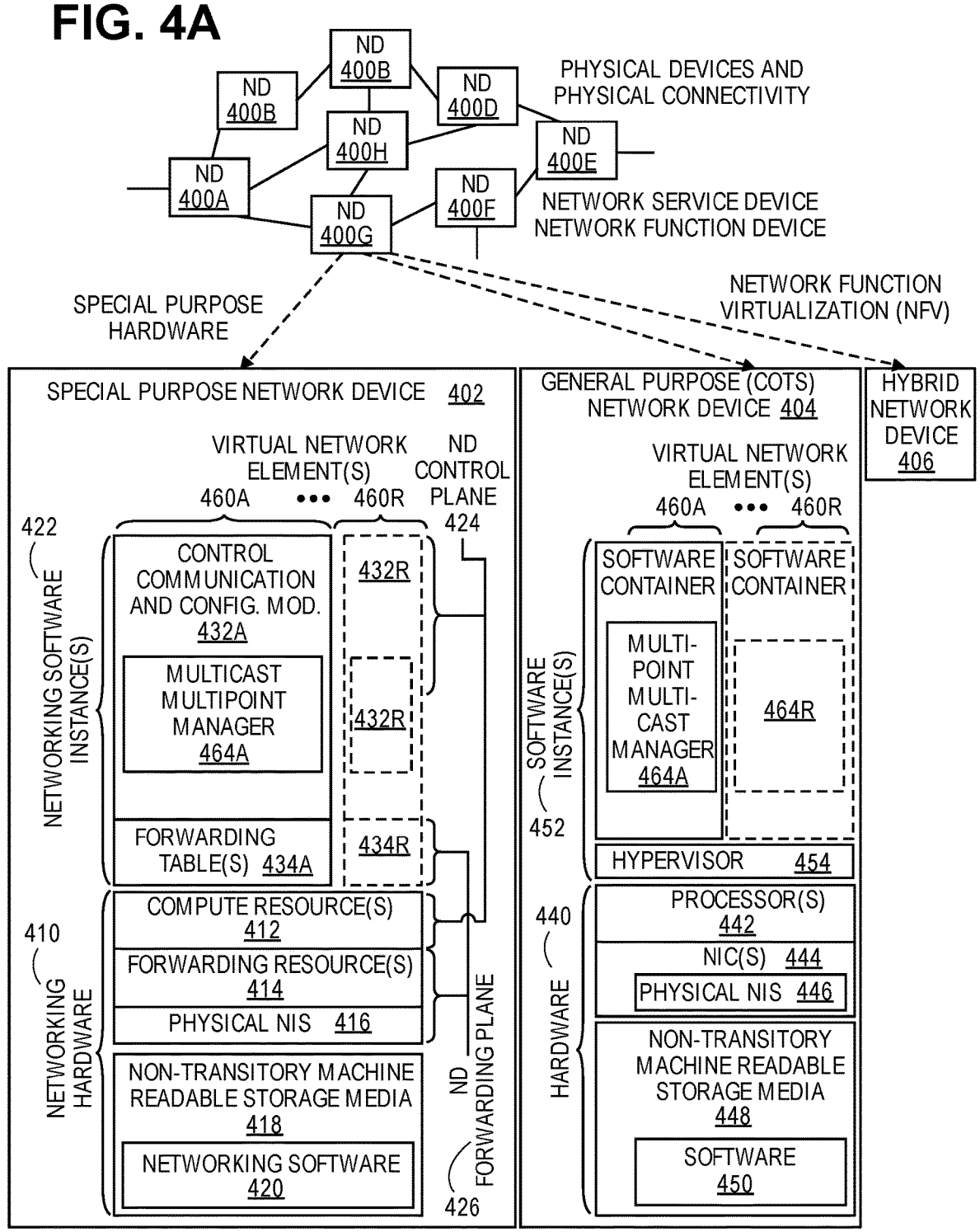
FIG. 4A illustrates connectivity between network devices (NDs) within an exemplary network, as well as three exemplary implementations of the NDs, according to some embodiments of the invention.

FIG. 4A illustrates connectivity between network devices (NDs) within an exemplary network, as well as three exemplary implementations of the NDs, according to some embodiments of the invention. FIG. 4A shows NDs 400A-H, and their connectivity by way of lines between 400A-400B, 400B-400C, 400C-400D, 400D-400E, 400E-400F, 400F-400G, and 400A-400G, as well as between 400H and each of 400A, 400C, 400D, and 400G. These NDs are physical devices, and the connectivity between these NDs can be wireless or wired (often referred to as a link). An additional line extending from NDs 400A, 400E, and 400F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application—specific integrated—circuits (ASICs) and a special-purpose operating system (OS); and 2) a general purpose network device 404 that uses common off-the-shelf (COTS) processors and a standard OS.

The special-purpose network device 402 includes networking hardware 410 comprising compute resource(s) 412 (which typically include a set of one or more processors), forwarding resource(s) 414 (which typically include one or more ASICs and/or network processors), and physical network interfaces (NIs) 416 (sometimes called physical ports), as well as non-transitory machine readable storage media 418 having stored therein networking software 420. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 400A-H. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs)

430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A). The networking software instance(s) 422 can implement applications 464A-R, specifically in this case multipoint multicast managers 464A-R that implement the functionality for implementing the methods of the RP or other nodes in the SPRING network as described herein above.

The special-purpose network device 402 is often physically and/or logically considered to include: 1) a ND control plane 424 (sometimes referred to as a control plane) comprising the compute resource(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the compute resource(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

Figure 4B:
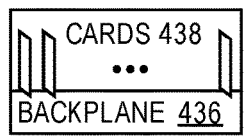
FIG. 4B illustrates an exemplary way to implement a special-purpose network device according to some embodiments of the invention.

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 404 includes hardware 440 comprising a set of one or more processor(s) 442 (which are often COTS processors) and network interface controller(s) 444 (NICs; also known as network interface cards) (which include physical NIs 446), as well as non-transitory machine readable storage media 448 having stored therein software 450. During operation, the processor(s) 442 execute the software 450 to instantiate one or more sets of one or more applications 464A-R. While one embodiment does not implement virtualization, alternative embodiments may use different forms of virtualization. For example, in one such alternative embodiment the virtualization layer 454 represents the kernel of an operating system (or a shim executing on a base operating system) that allows for the creation of multiple instances 462A-R called software containers that may each be used to execute one (or more) of the sets of applications 464A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 454 represents a hypervisor (sometimes referred to as a virtual machine monitor (VMM)) or a hypervisor executing on top of a host operating system, and each of the sets of applications 464A-R is run on top of a guest operating system within an instance 462A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 440, directly on a hypervisor (in which case the unikernel is sometimes described as running within a LibOS virtual machine), or in a software container, embodiments can be implemented fully with unikernels running directly on a hypervisor represented by virtualization layer 454, unikernels running within software containers represented by instances 462A-R, or as a combination of unikernels and the above-described techniques (e.g., unikernels and virtual machines both run directly on a hypervisor, unikernels and sets of applications that are run in different software containers).

The instantiation of the one or more sets of one or more applications 464A-R, as well as virtualization if implemented, are collectively referred to as software instance(s) 452. Each set of applications 464A-R, corresponding virtualization construct (e.g., instance 462A-R) if implemented, and that part of the hardware 440 that executes them (be it hardware dedicated to that execution and/or time slices of hardware temporally shared), forms a separate virtual network element(s) 460A-R. The software instance(s) 452 can implement applications 464A-R, specifically in this case multipoint multicast managers 464A-R that implement the functionality for implementing the methods of the RP or other nodes in the SPRING network as described herein above.

The virtual network element(s) 460A-R perform similar functionality to the virtual network element(s) 430A-R— e.g., similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 462A-R to VNEs also apply to embodiments where such a finer level of granularity and/or unikernels are used.

In certain embodiments, the virtualization layer 454 includes a virtual switch that provides similar forwarding services as a physical Ethernet switch. Specifically, this virtual switch forwards traffic between instances 462A-R and the NIC(s) 444, as well as optionally between the instances 462A-R; in addition, this virtual switch may enforce network isolation between the VNEs 460A-R that by policy are not permitted to communicate with each other (e.g., by honoring virtual local area networks (VLANs)).

The third exemplary ND implementation in FIG. 4A is a hybrid network device 406, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 4C:
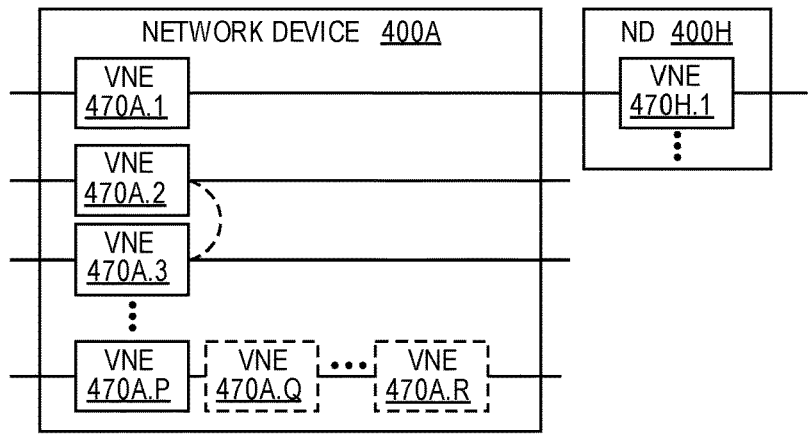
FIG. 4C illustrates various exemplary ways in which virtual network elements (VNEs) may be coupled according to some embodiments of the invention.

FIG. 4C illustrates various exemplary ways in which VNEs may be coupled according to some embodiments of the invention. FIG. 4C shows VNEs 470A.1-470A.P (and optionally VNEs 470A.Q-470A.R) implemented in ND 400A and VNE 470H.1 in ND 400H. In FIG. 4C, VNEs 470A.1-P are separate from each other in the sense that they can receive packets from outside ND 400A and forward packets outside of ND 400A; VNE 470A.1 is coupled with VNE 470H.1, and thus they communicate packets between their respective NDs; VNE 470A.2-470A.3 may optionally forward packets between themselves without forwarding them outside of the ND 400A; and VNE 470A.P may optionally be the first in a chain of VNEs that includes VNE 470A.Q followed by VNE 470A.R (this is sometimes referred to as dynamic service chaining, where each of the VNEs in the series of VNEs provides a different service—e.g., one or more layer 4-7 network services). While FIG. 4C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 4A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 4A may also host one or more such servers (e.g., in the case of the general purpose network device 404, one or more of the software instances 462A-R may operate as servers; the same would be true for the hybrid network device 406; in the case of the special-purpose network device 402, one or more such servers could also be run on a virtualization layer executed by the compute resource(s) 412); in which case the servers are said to be co-located with the VNEs of that ND.

A virtual network is a logical abstraction of a physical network (such as that in FIG. 4A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 4D:
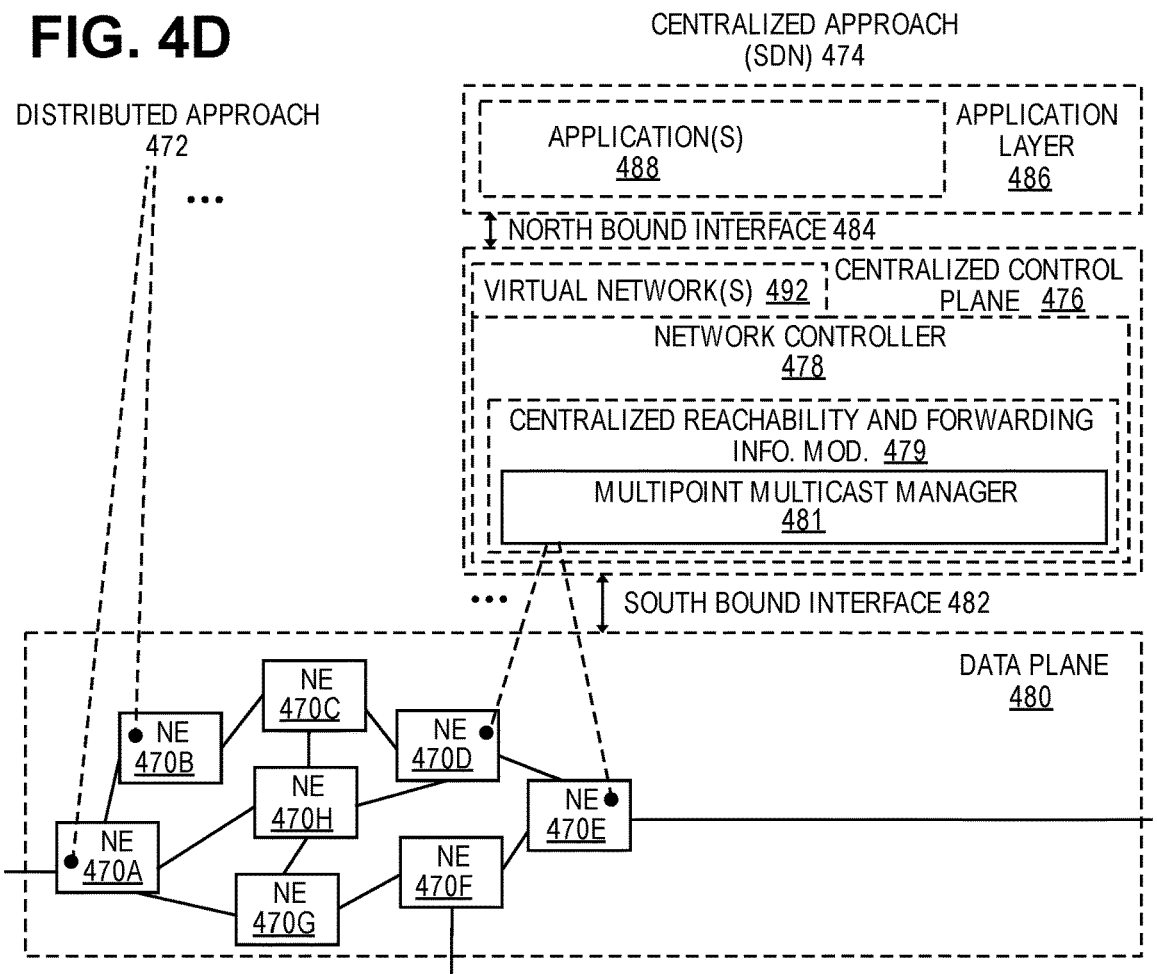
FIG. 4D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 4D illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4D illustrates network elements (NEs) 470A-H with the same connectivity as the NDs 400A-H of FIG. 4A.

FIG. 4D illustrates that the distributed approach 472 distributes responsibility for generating the reachability and forwarding information across the NEs 470A-H; in other words, the process of neighbor discovery and topology discovery is distributed.

For example, where the special-purpose network device 402 is used, the control communication and configuration module(s) 432A-R of the ND control plane 424 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 470A-H (e.g., the compute resource(s) 412 executing the control communication and configuration module(s) 432A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 424. The ND control plane 424 programs the ND forwarding plane 426 with information (e.g., adjacency and route information) based on the routing structure(s). For example, the ND control plane 424 programs the adjacency and route information into one or more forwarding table(s) 434A-R (e.g., Forwarding Information Base (FIB), Label Forwarding Information Base (LFIB), and one or more adjacency structures) on the ND forwarding plane 426. For layer 2 forwarding, the ND can store one or more bridging tables that are used to forward data based on the layer 2 information in that data. While the above example uses the special-purpose network device 402, the same distributed approach 472 can be implemented on the general purpose network device 404 and the hybrid network device 406.

FIG. 4D illustrates that a centralized approach 474 (also known as software defined networking (SDN)) that decouples the system that makes decisions about where traffic is sent from the underlying systems that forwards traffic to the selected destination. The illustrated centralized approach 474 has the responsibility for the generation of reachability and forwarding information in a centralized control plane 476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 476 has a south bound interface 482 with a data plane 480 (sometime referred to the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482 (which may use the OpenFlow protocol). Thus, the network intelligence is centralized in the centralized control plane 476 executing on electronic devices that are typically separate from the NDs.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the compute resource(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information—albeit less so than in the case of a distributed approach; such embodiments are generally considered to fall under the centralized approach 474, but may also be considered a hybrid approach).

While the above example uses the special-purpose network device 402, the same centralized approach 474 can be implemented with the general purpose network device 404 (e.g., each of the VNE 460A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 460A-R, in addition to communicating with the centralized control plane 476, may also play some role in determining reachability and/or calculating forwarding information—albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches.

FIG. 4D also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 4D shows the distributed approach 472 separate from the centralized approach 474, the effort of network control may be distributed differently or the two combined in certain embodiments of the invention. For example: 1) embodiments may generally use the centralized approach (SDN) 474, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 474, but may also be considered a hybrid approach.

While FIG. 4D illustrates the simple case where each of the NDs 400A-H implements a single NE 470A-H, it should be understood that the network control approaches described with reference to FIG. 4D also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

The network controller 478 can implement applications, specifically in this case multipoint multicast managers 481 that implement the functionality for implementing the methods of the RP or other nodes in the SPRING network. In other embodiments, the multipoint multicast managers 481 can be implemented in the application layer 486 with other applications 488.

Figure 4E:
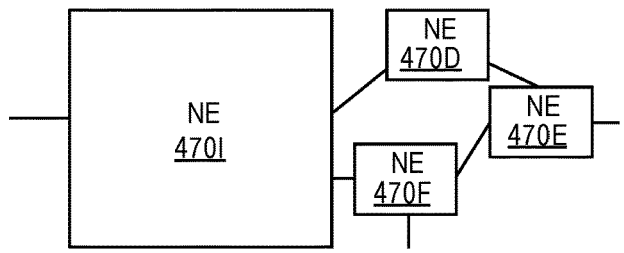
FIG. 4E illustrates the simple case of where each of the NDs implements a single NE, but a centralized control plane has abstracted multiple of the NEs in different NDs into (to represent) a single NE in one of the virtual network(s), according to some embodiments of the invention.
Figure 4F:
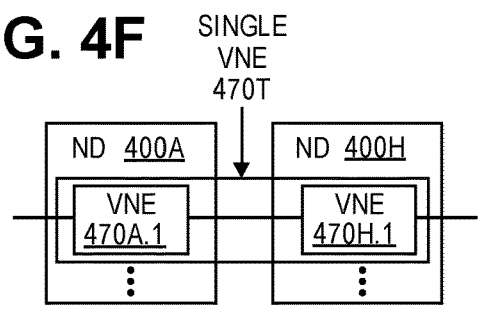
FIG. 4F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 4E and 4F respectively illustrate exemplary abstractions of NEs and VNEs that the network controller 478 may present as part of different ones of the virtual networks 492. FIG. 4E illustrates the simple case of where each of the NDs 400A-H implements a single NE 470A-H (see FIG. 4D), but the centralized control plane 476 has abstracted multiple of the NEs in different NDs (the NEs 470A-C and G-H) into (to represent) a single NE 4701 in one of the virtual network(s) 492 of FIG. 4D, according to some embodiments of the invention. FIG. 4E shows that in this virtual network, the NE 4701 is coupled to NE 470D and 470F, which are both still coupled to NE 470E.

FIG. 4F illustrates a case where multiple VNEs (VNE 470A.1 and VNE 470H.1) are implemented on different NDs (ND 400A and ND 400H) and are coupled to each other, and where the centralized control plane 476 has abstracted these multiple VNEs such that they appear as a single VNE 470T within one of the virtual networks 492 of FIG. 4D, according to some embodiments of the invention. Thus, the abstraction of a NE or VNE can span multiple NDs.

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
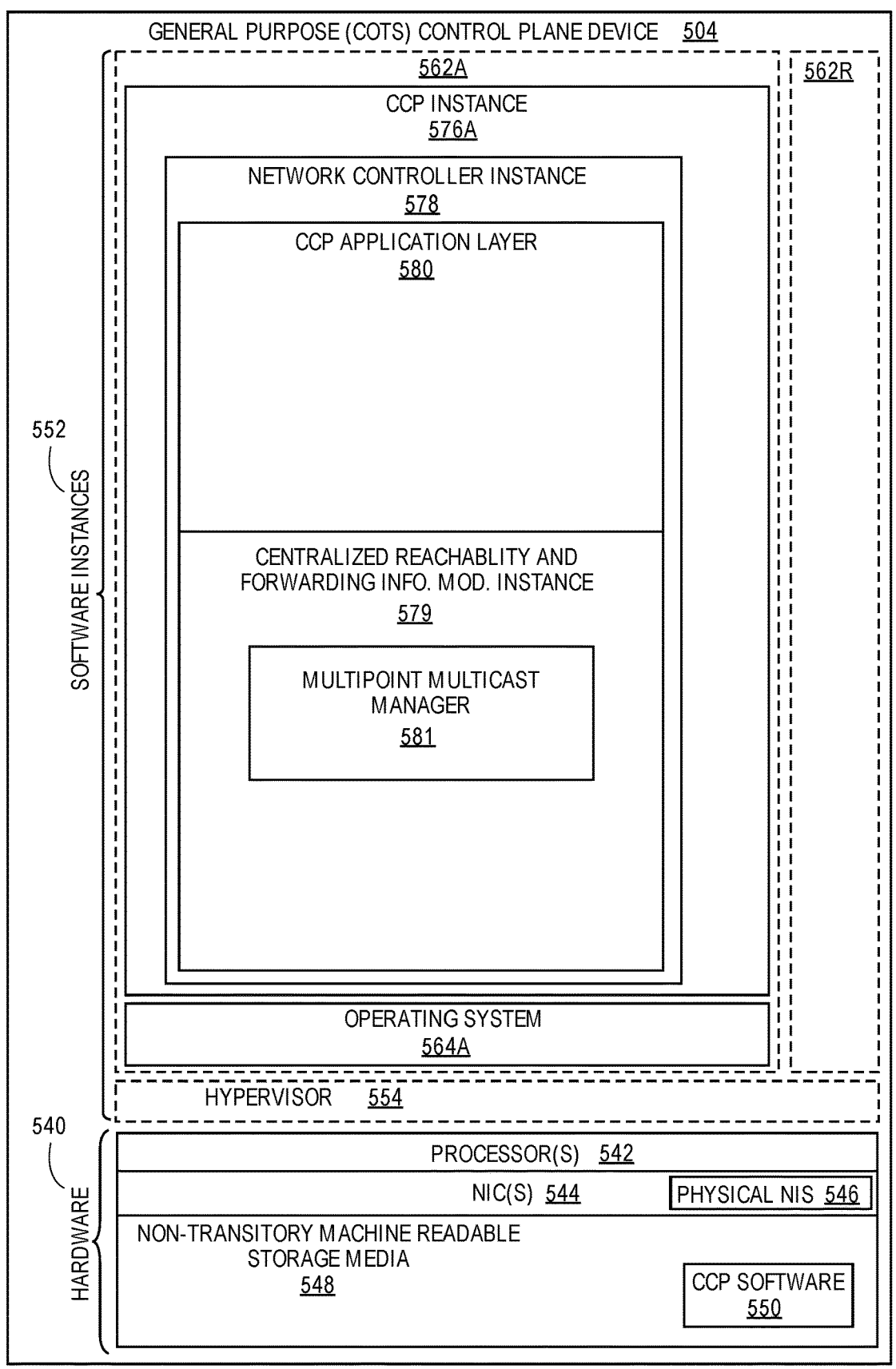
FIG. 5 illustrates a general purpose control plane device with centralized control plane (CCP) software 550), according to some embodiments of the invention.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein centralized control plane (CCP) software 550.

In embodiments that use compute virtualization, the processor(s) 542 typically execute software to instantiate a virtualization layer 554 (e.g., in one embodiment the virtualization layer 554 represents the kernel of an operating system (or a shim executing on a base operating system) that allows for the creation of multiple instances 562A-R called software containers (representing separate user spaces and also called virtualization engines, virtual private servers, or jails) that may each be used to execute a set of one or more applications; in another embodiment the virtualization layer 554 represents a hypervisor (sometimes referred to as a virtual machine monitor (VMM)) or a hypervisor executing on top of a host operating system, and an application is run on top of a guest operating system within an instance 562A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 540, directly on a hypervisor represented by virtualization layer 554 (in which case the unikernel is sometimes described as running within a LibOS virtual machine), or in a software container represented by one of instances 562A-R). Again, in embodiments where compute virtualization is used, during operation an instance of the CCP software 550 (illustrated as CCP instance 576A) is executed (e.g., within the instance 562A) on the virtualization layer 554. In embodiments where compute virtualization is not used, the CCP instance 576A is executed, as a unikernel or on top of a host operating system, on the "bare metal" general purpose control plane device 504. The instantiation of the CCP instance 576A, as well as the virtualization layer 554 and instances 562A-R if implemented, are collectively referred to as software instance(s) 552.

In some embodiments, the CCP instance 576A includes a network controller instance 578. The network controller instance 578 includes a centralized reachability and forwarding information module instance 579 (which is a middleware layer providing the context of the network controller 478 to the operating system and communicating with the various NEs), and an CCP application layer 580 (sometimes referred to as an application layer) over the middleware layer (providing the intelligence required for various network operations such as protocols, network situational awareness, and user—interfaces). At a more abstract level, this CCP application layer 580 within the centralized control plane 476 works with virtual network view(s) (logical view(s) of the network) and the middleware layer provides the conversion from the virtual networks to the physical view.

The centralized control plane 476 transmits relevant messages to the data plane 480 based on CCP application layer 580 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers.

Different NDs/NEs/VNEs of the data plane 480 may receive different messages, and thus different forwarding information. The data plane 480 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

The network controller instance(s) 578 can implement applications, specifically in this case multipoint multicast managers 581 that implement the functionality for implementing the methods of the RP or other nodes in the SPRING network. In other embodiments, these functions can be implemented in other areas of the control plane device 504.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 480, the packet (or a subset of the packet header and content) is typically forwarded to the centralized control plane 476. The centralized control plane 476 will then program forwarding table entries into the data plane 480 to accommodate packets belonging to the flow of the unknown packet. Once a specific forwarding table entry has been programmed into the data plane 480 by the centralized control plane 476, the next packet with matching credentials will match that forwarding table entry and take the set of actions associated with that matched entry.

While embodiments of the invention has been described in relation to a XYZ, other XYZ. Therefore, embodiments of the invention are not limited to XYZ. In addition, while embodiments of the invention have been described in relation to XYZ, alternative embodiments could be implemented such that XYZ. Such an embodiment could be implemented by having XYZ.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method executed by a network device in a source packet in routing, (SPRING) network, the method to establish a multipoint to multipoint multicast distribution tree where the network device is selected as a rendezvous point for the multipoint to multipoint multicast distribution tree, the method comprising:
    advertising, by the network device, the rendezvous point with a multicast group identifier and multicast segment identifier to each node of the SPRING network via a control plane protocol, the multicast segment identifier to enable the rendezvous point to map received traffic with the multicast segment identifier to the multipoint to multipoint multicast distribution tree for a multicast group and to be used by nodes in the SPRING network to identify the multipoint to multipoint multicast distribution tree when tunneling traffic for the associated multicast group to the rendezvous point;
    receiving, by the network device, at least one interest registration from receivers of the multicast group via the control plane protocol; and
    constructing, by the network device, the multipoint to multipoint multicast distribution tree with the rendezvous point as a root and each of the receivers as leaves using unicast tunnels and replication points.

2. The method of claim 1, further comprising:
    receiving data traffic tunneled to the rendezvous point from senders of the multicast group.

3. The method of claim 2, further comprising:
    forwarding received data traffic to the multicast distribution tree.

4. The method of claim 1, wherein the control plane protocol is an interior gateway protocol.

5. A method executed by a network device in a source packet in routing, (SPRING) network, the method to establish a multipoint to multipoint multicast distribution tree for a multicast group, the network device functioning as a node in the multipoint to multipoint multicast distribution tree, method comprising:
    receiving, by the network device, an advertisement of a rendezvous point sent to each node in the SPRING network via a control plane protocol, the advertisement including a multicast segment identifier, the multicast segment identifier to enable the rendezvous point to map received traffic with the multicast segment identifier to the multipoint to multipoint multicast distribution tree for a multicast group and to be used by nodes in the SPRING network to identify the multipoint to multipoint multicast distribution tree when tunneling traffic for the associated multicast group to the rendezvous point;
    sending a receive interest via control plane protocol for the multicast group;
    receiving receive interests via the control plane protocol for the multicast group; and
    determining a role in the multipoint to multipoint multicast distribution tree with the rendezvous point as a root and each receive interest as a leaf.

6. The method of claim 5, wherein the advertisement includes a multicast group identifier and multicast segment identifier.

7. The method of claim 5, further comprising:
    sending data traffic to the rendezvous point via a unicast tunnel for the multicast group.

8. The method of claim 5, further comprising:
    receiving data traffic from the rendezvous point via the multicast distribution tree for the multicast group.

9. The method of claim 5, wherein the control plane protocol is an interior gateway protocol.

10. A network device in a source packet in routing (SPRING) network, the network device configured to implement a method to establish a multipoint to multipoint multicast distribution tree where the network device is selected as a rendezvous point for the multipoint to multipoint multicast distribution tree, the network device comprising:
    a non-statutory machine-readable storage medium having stored therein a multipoint multicast manager; and
    a processor coupled to the non-statutory machine-readable storage medium, the processor configured to execute the multipoint multicast manager, the multipoint multicast manager to advertise the rendezvous point with a multicast group identifier and multicast segment identifier to each node of the SPRING network via a control plane protocol, the multicast segment identifier to enable the rendezvous point to map received traffic with the multicast segment identifier to the multipoint to multipoint multicast distribution tree for a multicast group and to be used by nodes in the SPRING network to identify the multipoint to multipoint multicast distribution tree when tunneling traffic for the associated multicast group to the rendezvous point, to receive at least one interest registration from receivers of the multicast group via the control plane protocol, and to construct the multipoint to multipoint multicast distribution tree with the rendezvous point as a root and each of the receivers as leaves using unicast tunnels and replication points.

11. The network device of claim 10, wherein when executed by the processor the multipoint multicast manager is further to receive data traffic tunneled to the rendezvous point from senders of the multicast group.

12. The network device of claim 11, wherein when executed by the processor the multipoint multicast manager is further to forward received data traffic to the multicast distribution tree.

13. The network device of claim 10, wherein the control plane protocol is an interior gateway protocol.

14. A computing device configured to execute a plurality of virtual machines, the plurality of virtual machines implementing network function virtualization (NFV), the computing device in communication with a network device, the network device in a source packet in routing (SPRING) network, the network device configured to implement a method to establish a multipoint to multipoint multicast distribution tree where the network device is selected as a rendezvous point for the multipoint to multipoint multicast distribution tree, the computing device comprising:
    a non-statutory machine-readable storage medium having stored therein a multipoint multicast manager; and
    a processor coupled to the non-statutory machine-readable storage medium, the processor configured to execute a virtual machine from the plurality of virtual machines, the virtual machine to execute the multipoint multicast manager, the multipoint multicast manager to advertise the rendezvous point with a multicast group identifier and multicast segment identifier to each node of the SPRING network via a control plane protocol, the multicast segment identifier to enable the rendezvous point to map received traffic with the multicast segment identifier to the multipoint to multipoint multicast distribution tree for a multicast group and to be used by nodes in the SPRING network to identify the multipoint to multipoint multicast distribution tree when tunneling traffic for the associated multicast group to the rendezvous point, to receive at least one interest registration from receivers of the multicast group via the control plane protocol, and to construct the multipoint to multipoint multicast distribution tree with the rendezvous point as a root and each of the receivers as leaves using unicast tunnels and replication points.

15. The computing device of claim 14, wherein when executed by the processor the multipoint multicast manager is further to receive data traffic tunneled to the rendezvous point from senders of the multicast group.

16. The computing device of claim 15, wherein when executed by the processor the multipoint multicast manager is further to forward received data traffic to the multicast distribution tree.

17. The computing device of claim 14, wherein the control plane protocol is an interior gateway protocol.

18. A control plane device is configured to implement a control plane of a software defined networking (SDN) network including a network device, the network device in a source packet in routing (SPRING) network, the network device configured to implement a method to establish a multipoint to multipoint multicast distribution tree where the network device is selected as a rendezvous point for the multipoint to multipoint multicast distribution tree, the control plane device comprising:

a non-statutory machine-readable storage medium having stored therein a multipoint multicast manager; and a processor coupled to the non-statutory machine-readable storage medium, the processor configured to execute the multipoint multicast manager, the multipoint multicast manager to advertise the rendezvous point with a multicast group identifier and multicast segment identifier to each node of the SPRING network via a control plane protocol, the multicast segment identifier to enable the rendezvous point to map received traffic with the multicast segment identifier to the multipoint to multipoint multicast distribution tree for a multicast group and to be used by nodes in the SPRING network to identify the multipoint to multipoint multicast distribution tree when tunneling traffic for the associated multicast group to the rendezvous point, to receive at least one interest registration from receivers of the multicast group via the control plane protocol, and to construct the multipoint to multipoint multicast distribution tree with the rendezvous point as a root and each of the receivers as leaves using unicast tunnels and replication points.

19. The control plane device of claim 18, wherein when executed by the processor the multipoint multicast manager is further to receive data traffic tunneled to the rendezvous point from senders of the multicast group.

20. The control plane device of claim 18, wherein when executed by the processor the multipoint multicast manager is further to forward received data traffic to the multicast distribution tree.

* * * * *